(12) United States Patent
Wang et al.

(10) Patent No.: US 7,869,087 B2
(45) Date of Patent: Jan. 11, 2011

(54) COLOR PRINTER CHARACTERIZATION OR CALIBRATION TO CORRECT FOR SPATIAL NON-UNIFORMITY

(75) Inventors: Shen-ge Wang, Fairport, NY (US); Raja Bala, Webster, NY (US); Willey Huaili Wang, Monticello, IN (US)

(73) Assignee: Xerox Corporation, Norwalk, CT (US)

( * ) Notice: Subject to any disclaimer, the term of this patent is extended or adjusted under 35 U.S.C. 154(b) by 573 days.

(21) Appl. No.: 11/694,960

(22) Filed: Mar. 31, 2007

(65) Prior Publication Data

US 2008/0239344 A1    Oct. 2, 2008

(51) Int. Cl.
G06F 15/00    (2006.01)
G03F 3/08    (2006.01)
(52) U.S. Cl. ........................................ 358/1.9; 358/518
(58) Field of Classification Search .................. None
See application file for complete search history.

(56) References Cited

U.S. PATENT DOCUMENTS

| | | | |
|---|---|---|---|
| 5,091,972 A * | 2/1992 | Kwon et al. ................. | 382/277 |
| 5,305,119 A | 4/1994 | Rolleston et al. | |
| 5,412,491 A | 5/1995 | Bachar | |
| 5,528,386 A | 6/1996 | Rolleston et al. | |
| 5,689,350 A | 11/1997 | Rolleston | |
| 6,178,007 B1 | 1/2001 | Harrington | |
| 6,262,810 B1 | 7/2001 | Bloomer | |
| 6,330,078 B1 * | 12/2001 | Wang .......................... | 358/1.9 |
| 6,360,007 B1 | 3/2002 | Robinson et al. | |
| 6,643,029 B2 | 11/2003 | Kumada et al. | |
| 6,714,319 B1 * | 3/2004 | Thieret et al. ................ | 358/1.9 |
| 2003/0063275 A1 | 4/2003 | Hubble, III et al. | |
| 2004/0136015 A1 * | 7/2004 | Van de Capelle et al. .... | 358/1.9 |
| 2004/0257595 A1 | 12/2004 | Sharma et al. | |
| 2004/0264768 A1 | 12/2004 | Sharma et al. | |
| 2004/0264769 A1 | 12/2004 | Sharma et al. | |
| 2004/0264770 A1 | 12/2004 | Sharma et al. | |
| 2004/0264781 A1 | 12/2004 | Eschbach et al. | |

(Continued)

OTHER PUBLICATIONS

Sharma, Guarav: "Digital Color Imaging Handbooks," CRC Press, 2003, pp. 90-97.

*Primary Examiner*—Twyler L Haskins
*Assistant Examiner*—Barbara D Reinier
(74) *Attorney, Agent, or Firm*—Fay Sharpe LLP (57) ABSTRACT

Methods and systems are presented for calibrating or characterizing a color printer or determining the color response of a color printer to combat spatial non-uniformity, in which color patches are printed on a test page according to an input matrix of input color in a printer-dependent-color space and the test page is measured to provide a corresponding output matrix of output color in a printer-independent-color space. Initial forward and inverse color transforms between the input and the output colors are generated based on the input and the output matrices. The output values are mapped to the input color space based on the initial inverse transform to form a feedback matrix, and spatial non-uniformities present in the printed test page are estimated according to noise values derived from the input matrix and the feedback matrix. The input matrix is modified according to the estimated spatial non-uniformity to form a modified input matrix of input color, and final forward and inverse transforms are generated for the color printer according to the modified input matrix and the output matrix.

25 Claims, 6 Drawing Sheets

U.S. PATENT DOCUMENTS

2005/0018219 A1* 1/2005 Senn et al. .................... 358/1.8
2005/0071104 A1* 3/2005 Viturro et al. ................. 702/85
2006/0087665 A1   4/2006 Wang
2007/0024932 A1* 2/2007 Ogatsu et al. ................ 358/518
2007/0097461 A1* 5/2007 Ng et al. ...................... 358/504

* cited by examiner

COLOR PRINTER CHARACTERIZATION OR CALIBRATION TO CORRECT FOR SPATIAL NON-UNIFORMITY

BACKGROUND

The present disclosure is generally related to the field of color image/text printing or display systems and to methods and systems for calibrating color output devices, such as color displays, printers and printing devices thereof. Color has become essential as a component of communication and facilitates the sharing of knowledge and ideas, and there are continuous efforts to improve the accuracy and total image quality of digital color output devices.

Color images are commonly represented as one or more separations, each separation comprising a set of color density signals for a single primary or secondary color. Color density signals are commonly represented as digital gray or contone pixels, varying in magnitude from a minimum to a maximum, with a number of gradients between corresponding to the bit density of the system. Thus, a common 8-bit system provides 256 shades of each primary color. A color can therefore be considered the combination of magnitudes of each pixel, which when viewed together, present the combination color. Usually, printer signals include three subtractive primary color signals (i.e., Cyan, Magenta and Yellow) and a Black signal, which together can be considered the printer colorant signals. Each color signal forms a separation and when combined together with the other separations, forms the color image.

In order to facilitate the exchange and reuse of documents it is desirable to specify document properties in a printer-independent fashion, where possible. Colors are therefore preferably specified in a printer-independent color space based on the characteristics of human vision. Since the native control spaces of output devices (e.g., a printer's CMYK values) are not printer-independent color spaces, in order to print or display a given color it is necessary to determine the device control values corresponding to specified printer-independent color values. This is normally accomplished by a three-step procedure.

First, a set of color patches with pre-determined device control values is output on the device and the color of each patch is measured in printer-independent color coordinates. Second, using the device control values and the corresponding measured printer-independent color values; a "forward device-response function" or forward transform is estimated. The "forward device-response function" represents the mapping from device control values to the printer-independent-color values produced by the device in response to the control values. Third, the "forward device-response function" or forward transform can be "inverted" to obtain a "device-correction-function" or inverse transform. This transform or "device-correction-function" maps each printer-independent color to the device control values that produce the specified printer-independent color value on the output device. The "device-correction-function" is typically pre-computed and stored. In order to produce a given color on the output device, the corresponding printer-independent color values are mapped through the "device correction-function" to obtain control values. When the device is driven with these control values, the desired color is produced.

Figure 5:
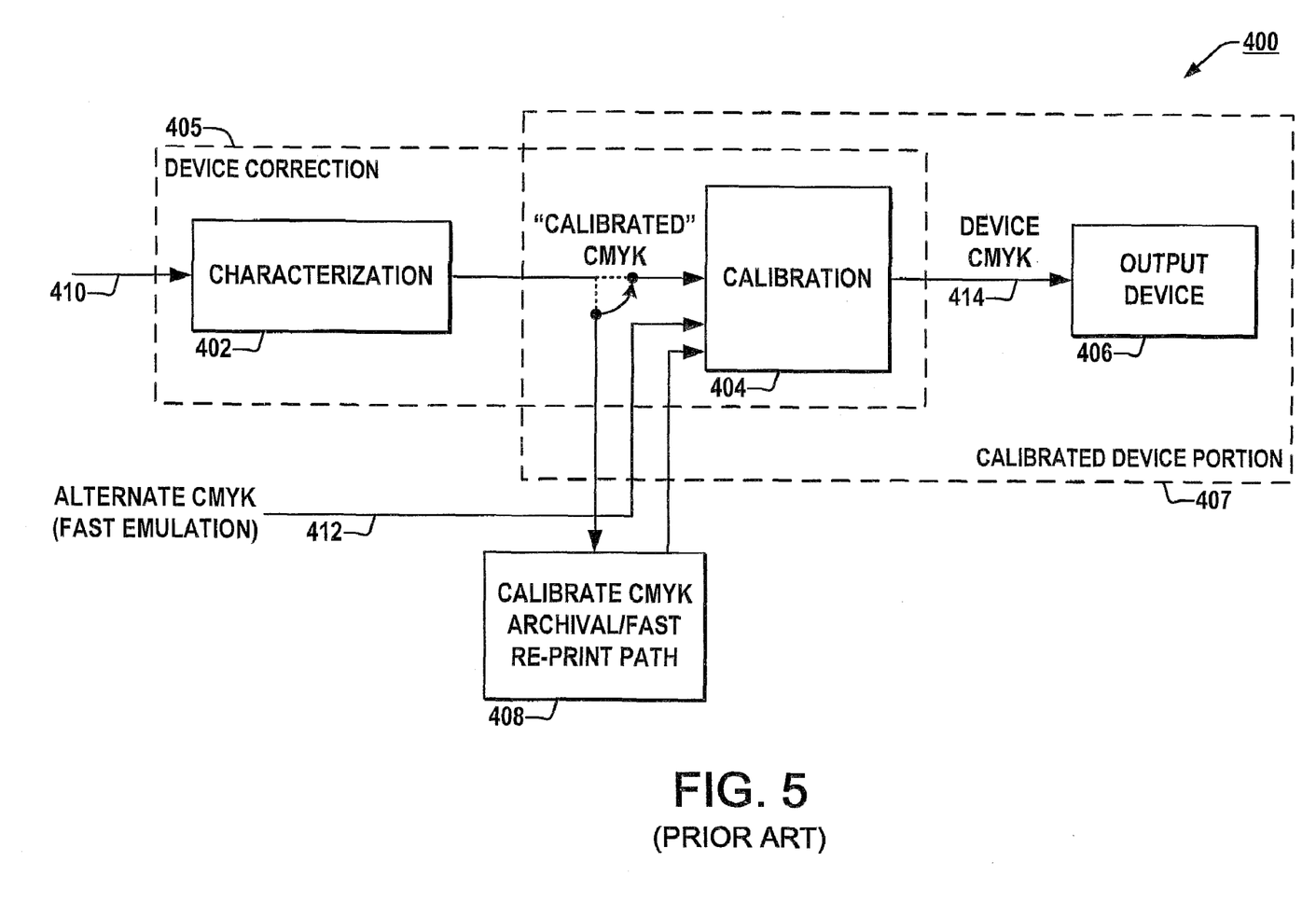
FIG. 5 is a schematic diagram illustrating a conventional system that partitions a device-correction function into characterization and calibration.

It is common practice to separate the "device correction-function" into two parts: a "calibration" function that immediately precedes the device and a "characterization" function, which addresses the device "through" the calibration function. This separation is illustrated in FIG. 5 for the case of a CMYK printer. FIG. 5 illustrates a conventional system 400, which partitions "device-correction function" into characterization and calibration. For example, system 400 includes a printer-independent-color which can be provided as input 410 to a characterization routine 402 whose output is fed to a calibration unit 404, whose output in turn is fed to an output device 406 via output line 414. Additionally, lines 408 and 412 indicate alternate CMYK paths used for fast reprint and fast emulation respectively, that are fed to calibration unit 404.

Another example of a calibration system includes U.S. Pat. No. 5,305,119 to Rolleston et al, "Color Printer Calibration Architecture," which issued on Apr. 19, 1994 and is assigned to Xerox Corporation. U.S. Pat. No. 5,305,119 is generally directed toward a method of calibrating a response of a printer to an image described in terms of colorimetric values. A further example of a calibration method and system is described in U.S. Pat. No. 5,528,386 to Rolleston et al, "Color Printer Calibration Architecture," which issued on Jun. 18, 1996 and is also assigned to Xerox Corporation. U.S. Pat. No. 5,528,386 generally describes a conventional one-dimensional architecture. Both U.S. Pat. Nos. 5,305,119 and 5,528,386 are incorporated herein by reference, and are referenced for general edification and illustrative purposes only.

The purpose of the calibration transformation is to facilitate a trade-off. Unlike the full device-correction function, the calibration transformation provides control of the output device only in a limited fashion. However, in comparison to the full device-correction function the calibration transformation also offers significant advantages in that it requires substantially reduced measurement effort and also a substantially lower computational effort. The lower computational effort requirement allows it to be incorporated in high-speed real-time printing image-processing chains for which the full device-correction function may be too computation and/or memory intensive. For color output devices, particularly those utilized in the printing arts, calibration is typically performed for the Black channel (K) independently and for the Cyan (C), Magenta (M), and Yellow (Y) channels either independently or together.

Figure 6:
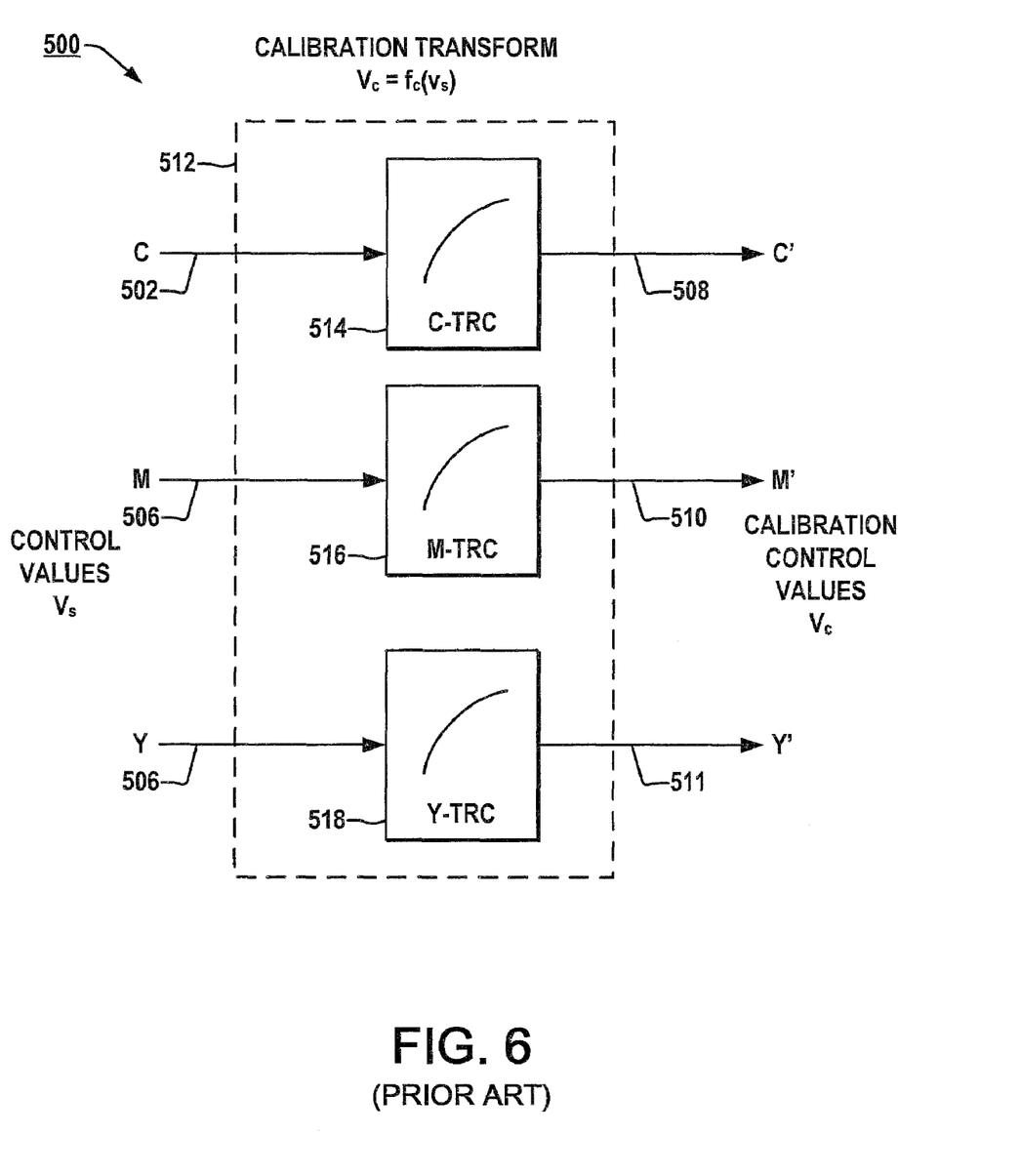
FIG. 6 is a schematic diagram illustrating a conventional three-color one-dimensional calibration transformation system.

As an illustrative example, consider the case of a 3-channel (CMY) printer is considered. The goal of calibration is to determine a calibration transform from CMY to C'M'Y' that maintains a desired printer response in selected regions of color space. Additionally, the calibration transform is required to be computationally efficient with a small memory requirement so that it can be incorporated in high-speed real-time printing paths. Traditionally, the calibration transform has been applied in the form of one-dimensional correction to the individual channels for the device. For CMY, the calibration is applied as tone-response corrections (TRCs) for each of the C, M, and Y channels. FIG. 6 illustrates a traditional three-color one-dimensional calibration transformation system 500. As indicated in FIG. 6, arrows 502, 504 and 506 respectively represent C, M, and Y inputs to transformations 514, 516, and 518. Dashed line 512 generally indicates the boundaries of a calibration transformation, which is composed of individual transformations 514, 516, and 518. Outputs are indicated by arrows 508, 510 and 511, which respectively represent C', M' and Y'. It can thus be appreciated that the following equation applies to system 500 of FIG. 6:

$$C'=f_1(C), M'=f_2(M), Y'=f_3(Y)$$

Calibration and/or characterization of color printers is often subject to different forms of noise. In particular one type of noise occurs in the form of discrepancies between the printer-dependent CMY or CMYK output values produced by the inverse transform for given printer-independent input colors, and the true input printer-dependent CMY or CMYK values that originally produced those printer-independent colors. Such noise may be attributable, at least partially, to spatial non-uniformity of the printer, where providing identical CMY or CMYK values to two patches at different spatial x and y locations on the page can result in the printing of two colors that are perceived and measured as being distinctly different. Spatial non-uniformity may generally occur in the form of banding, streaks and mottle. Moreover, the spatial non-uniformity may not repeat the same noise pattern from one page to the next, and consequently may be difficult to correct prior to printing. Prior attempts to combat printer spatial non-uniformity include randomizing the locations of printed test patches and averaging of large numbers of measurements to reduce the noise. However, this approach requires dedication of measurement equipment for long periods of time and is thus impractical in many applications. Consequently, there remains a need for improved color printer calibration and characterization techniques by which the effects of spatial non-uniformity can be mitigated without significantly increasing calibration or characterization time or expense.

BRIEF DESCRIPTION

Methods and systems are provided for color printer calibration or characterization and for determining the color response of a color printer in which spatial non-uniformities are estimated in the printer-dependent-color space (e.g., a first space) based on measurement of a printed test page, and the effects of space-dependent noise are removed from the calibration or characterization mapping. In certain aspects of the disclosure, color patches are printed on a test page according to an input matrix of input color (printer-dependent-color, e.g., CMY or CMYK) and the test page is measured to provide a corresponding output matrix of output color (printer-independent-color, e.g., CIELab). Here the rows and columns of the matrix correspond directly with the spatial layout of rows and columns of color patches on a printed target. Initial or first forward and inverse color transforms between the input and the output colors are generated based on the input and the output matrices. The output matrix is mapped through the initial inverse transform to form a feedback matrix in the input (printer-dependent) color space. Spatial non-uniformity in the printed test page is estimated according to noise values derived by correlating the input matrix and the feedback matrix. The input matrix is modified according to the estimated spatial non-uniformity to form a modified input matrix of input color, and final or second forward and inverse transforms are generated for the color printer according to the modified input matrix and the output matrix.

One or more aspects of the disclosure provide methods for determining the color response of a printer, in which a matrix of color patches is printed on a test page according to an input matrix of input (printer dependent) colors. A corresponding output matrix of output colors is derived by measuring printed color patches of the test page. Initial forward and inverse color transforms between the input and the output colors are generated based on the input and the output matrices, and a feedback matrix is formed by converting the output colors of the output matrix to input colors using the initial inverse transform. The method further includes estimating spatial non-uniformity present in the printed test page, modifying the input matrix according to the estimated spatial non-uniformity to form a modified input matrix, and generating final forward and inverse transforms for the color printer according to the modified input matrix and the output matrix.

Further aspects of the disclosure relate to a method for calibrating or characterizing a color printer, comprising printing a matrix of color patches on a test page according to an input matrix of input colors, measuring the printed color patches, deriving a corresponding output matrix of output colors, deriving first or initial forward and inverse transforms according to the input matrix and the output matrix, and converting the output colors of the output matrix to the input color space using the first inverse transform to form a feedback matrix. The method further comprises computing individual color channel noise values in the input color space according to the input matrix and the feedback matrix, extracting spatial non-uniformity values according to the individual channel noise values to form a correction matrix, computing a modified input matrix according to the input matrix and the correction matrix, and deriving second or final forward and inverse transforms according to the modified input matrix and the first output matrix.

Other aspects of the disclosure relate to color printer calibration or characterization system that is comprised of a component that converts an output matrix of output color (printer-independent-color) corresponding to measurements of printed color patches of the test page into input color (printer-dependent-color) to form a feedback matrix, and a second component that estimates spatial non-uniformity present in the printed test page using the feedback matrix and the input matrix used in printing the test page. The system further includes a component that modifies the input matrix according to the estimated spatial non-uniformity to form a modified input matrix, and another component to generate forward and inverse color transforms for the color printer according to the output matrix and the modified input matrix.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
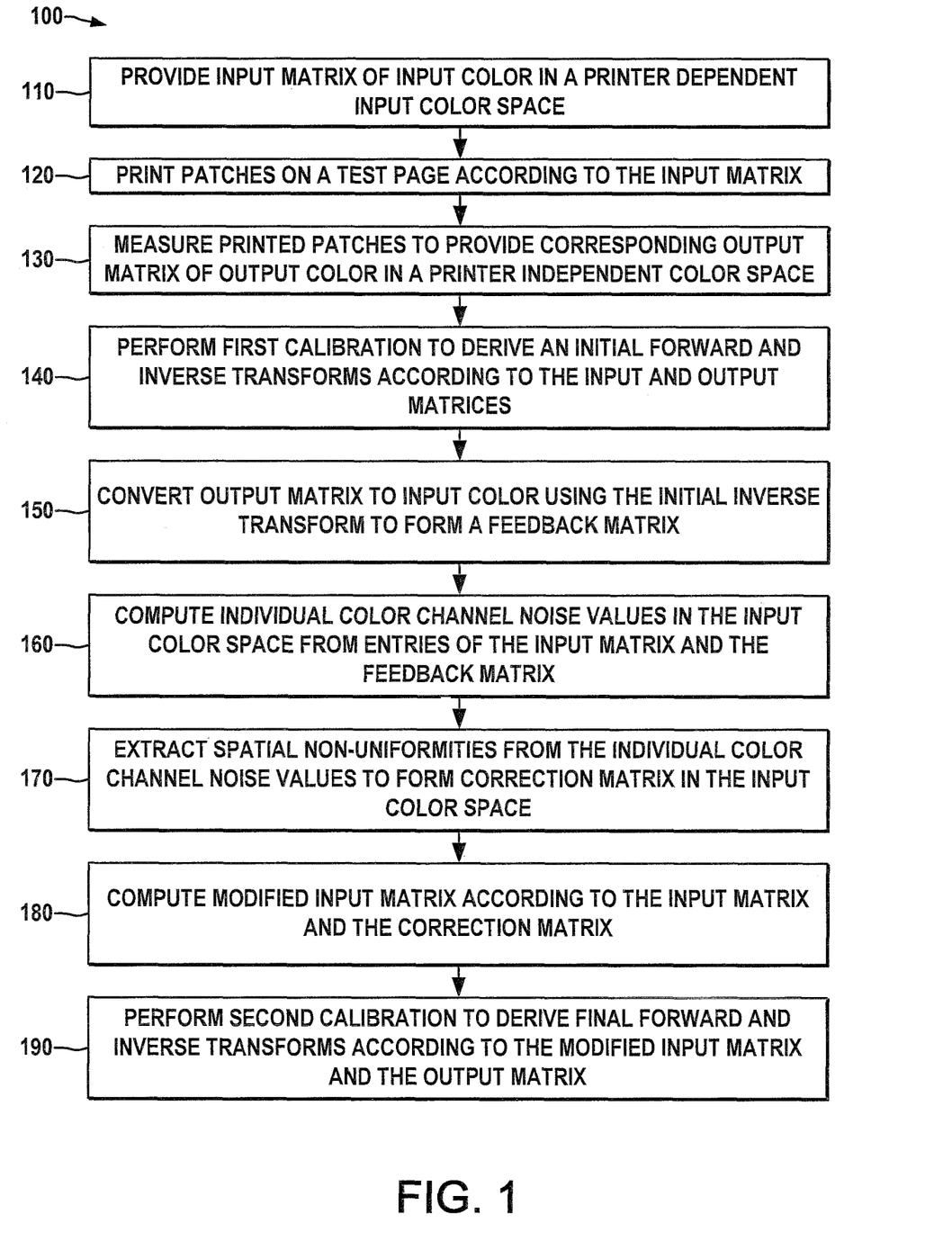
FIG. 1 is a flow diagram illustrating an exemplary method for calibrating or characterizing a color printer in accordance with the present disclosure.

Referring now to the drawings, FIG. 1 illustrates an exemplary method 100 for calibrating or characterizing a color printer by which the adverse effects of printer spatial non-uniformities can be addressed in an efficient manner. While the exemplary method 100 is illustrated and described below in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 100 and other methods of the disclosure may be implemented in hardware, software, or combinations thereof, whether in a single calibration system or in distributed form in two or more components or systems, in order to characterize or calibrate a color printing device, and may be employed in any form of printing system including without limitation desktop printers, network printers, stand-alone copiers, multi-function printer/copier/facsimile devices, high-speed printing/publishing systems and digital printing presses, wherein the disclosure is not limited to the specific applications and implementations illustrated and described herein.

The printers with which the various calibration/characterization or printer response determination systems and methods may be employed can output color indicia on any form of printable media using any printing or marking substance, such as liquid ink, solid ink, toner and/or colorant, for example, in monochrome (e.g., black) or one or more colors, or any combination thereof. Thus, while the following description is provided in the context of color printer calibration, the disclosure is also applicable to mono-chromatic printers or single-channel calibration of color printers as well. In this regard, the subject matter of the present disclosure is capable of broad use in a wide variety of applications and environments, and the illustrations and descriptions herein are merely exemplary and are not intended to be limiting. In addition, the various aspects of the present disclosure may be used in association with any printer-dependent-color spaces, including without limitation RGB, CMY, CMYK, etc., and also with any printer-independent-color spaces, including but not limited to XYZ, the CIELab, etc.

The present disclosure may be implemented to facilitate improved color calibration/characterization through estimation of spatial non-uniformity presented on a printed target page and application of a correction to the same test page. In certain exemplary embodiments, moreover, noise including spatial non-uniformity is characterized in the printer-dependent color space (e.g., the CMY or CMYK space), and the color calibration noise may be modeled using a formulation with a space dependence term. In this example, free parameters in the space dependent term may be fit from the CMY or CMYK residual data, and the effects of the space dependent term may be subtracted out of the calibration to combat the adverse consequences of color printer spatial non-uniformity. The disclosure in this respect does not require special targets or patch duplication to address spatial non-uniformity and thus can be integrated into color printer calibration and/or characterization workflows and systems without increasing measurement cost. Furthermore, the disclosed techniques can also provide an indication of printer non-uniformity as diagnostic information.

The method 100 begins in FIG. 1 at 110 with provision of an input matrix of input color values in a printer-dependent-color space. The input matrix may be provided at 110 in any suitable printer-dependent-color space format, such as CMY, CMYK, etc., (e.g., a first color space) and in one CMY color space example is comprised of a plurality of sets of values CMY(x, y) for cyan, magenta, and yellow defining a desired output color, with a set of such values being provided for each of a series of designated "x" and "y" patch locations of a test page. The input matrix provided at 110 and other matrices discussed herein, moreover, can be arranged and stored in any suitable form, such as an electronic data file, etc. At 120, a matrix of color patches is printed on a test page using the color printer of interest according to the input color values of the input matrix. The printed color patches of the test page are then measured at 130 and an output matrix of output color values in a printer-independent-color space (e.g., second color space) is provided which correspond to the measured color patches of the test page. The printed patches of the test page may be measured at 130 using any suitable color measurement apparatus, including without limitation a calorimeter, spectrophotometer, scanner, digital camera, etc., and the corresponding set of output color values may be of any suitable form and format, and can be provided in any printer-independent-color space, such as the CIELab space in one example. In this embodiment, the output matrix includes a set of L, a, and b values (some or all of which may be zero) for each of the measured patches at corresponding x, y locations of the test page, and the output matrix may be arranged in any suitable organizational form and stored in any suitable medium, such as an electronic data file, etc. In one embodiment, the second space can be defined by RGB signals from a scanner. In another possible implementation, the second space is defined by RGB signals from a digital camera.

At 140, a first 'calibration' is performed in which a first or initial inverse transform is derived according to the input matrix and the output matrix. A first or initial forward transform can also be derived at 140, although not a requirement of the present disclosure. The first inverse transform can be any form of mapping between the printer-dependent and printer-independent-color spaces, including without limitation one or more matrices, look-up-tables (LUTs), combinations thereof, or other mathematical representations by which one or more sets of the measured printer-independent-color space values can be converted to the printer-dependent-color space. At 150, the printer-independent-color space values of the output matrix are converted to printer-dependent-color space patch values using the initial inverse transform derived in the first 'calibration' at 140, in order to form a feedback matrix.

In one CMY color space example, the feedback matrix includes sets of values C'M'Y'(x, y) defining the measured color at the particular x, y locations on the test page. If the color printer is theoretically perfect, the patch color values of the input matrix of 110 and the feedback matrix of 150 should be identical. However, as noted above, the color printer used to generate the test page may suffer from spatial non-uniformity in the output printing mechanisms thereof, in which case there will be differences in the values of the input matrix and the feedback matrix, and such differences are hereinafter termed "noise" or "errors" for purposes of description. Accordingly at 160 in FIG. 1, individual color channel noise values are computed in the printer-dependent-color space (e.g., in the CMY color space) according to the input matrix and the feedback matrix. These noise values may be arranged in a noise matrix or other data structure, for instance, with sets of values for each of the three colors C, M, and Y (e.g., or four values C, M, K, and K) corresponding to the difference between the corresponding color values of the input and feedback matrices at each x, y location (e.g., subtracting individual color channel values of the input matrix from the corresponding individual color channel values of the feedback matrix in one embodiment).

With the error or noise values determined at 160, spatial non-uniformity values are extracted at 170 to form a correction matrix in the printer-dependent-color space. Any suitable form of analytical processing, computations, or other operations can be employed at 160 by which any spatial non-uniformities (e.g., banding, streaks, mottle, etc.) can be discerned from the noise values, In this respect, spatial non-uniformities can comprise without limitation any space-dependent deviation in the output of the color printer, wherein the resulting spatial non-uniformities on the printed patches on the test page may, but need not, be detectable by visual human inspection, but can be identified and extracted by processing of the noise values obtained at 160. In one example, the extraction at 170 includes estimation of both space independent and space dependent factors for the individual color channels at the x, y locations, and generation of final spatial non-uniformity estimate values according to the estimated space independent and space dependent factors, which operations can be performed by any suitable numeric technique to derive the values of the correction matrix that are indicative of spatial non-uniformity in the color printer being calibrated or characterized, As illustrated and described further below with respect to FIG. 4, the space independent factors can be estimated using linear regression, with the space dependent factors being estimated by use of a smoothing function, linear regression, and/or neural network-based data fitting techniques.

At 180, modified printer-dependent-color space values are computed according to the input matrix and the correction matrix to form a modified input matrix. Any suitable processing operation(s) can be employed at 180 by which the printer-dependent-color space values of the input matrix are adjusted according to the extracted spatial non-uniformities. In one possible implementation, the computation at 180 includes subtracting the spatial non-uniformity values of the correction matrix from the printer-dependent-color space values of the input matrix to form the modified input matrix.

Using the adjusted or modified values forming the modified input matrix, a second 'calibration' is performed at 190 to derive a second or final inverse transform according to the modified input matrix and the output matrix, wherein a second or final forward transform may also be generated at 190, although not a requirement of the present disclosure. The second inverse transform can be derived at 190 by any suitable technique to provide a mapping between the printer-dependent and printer-independent-color spaces, and the transform can be of any suitable form such as one or more matrices, look-up-tables, combinations of matrices and tables, or other mathematical representations by which one or more sets of the measured printer-independent-color space values can be converted to the printer-dependent-color space. This second inverse transform may thereafter be employed in operating the calibrated or characterized color printer, wherein the use of the modified input matrix values in generating the second transforms facilitates mitigation of the adverse effects of spatial non-uniformity associated with the printer.

The inventors have thus appreciated that noise caused by color printer spatial non-uniformity can be addressed in color characterization or calibration processes without requiring extensive analysis of multiple test pages and without the cost associated with occupying expensive lab equipment for extended periods of time. The exemplary techniques presented in the above described method 100 provide for estimation of possible spatial non-uniformity presented on the printed test page, and correction thereof using the data only from the same page, and moreover is applicable to situations where the non-uniformity is repeatable or to cases where the spatial non-uniformity varies from page to page. Through the approaches of the present disclosure, the final calibration output exemplified in the second transforms derived at 190 in FIG. 1 provides a representation of the "average" performance of the calibrated printer and may thus combat both repeatable and non-repeating spatial non-uniformity. In addition, the methods of this disclosure can be incorporated into existing color calibration and characterization operations and systems to facilitate improved color accuracy without significant modifications to existing routines, and without requiring additional measurements from patch duplication.

Figure 2:
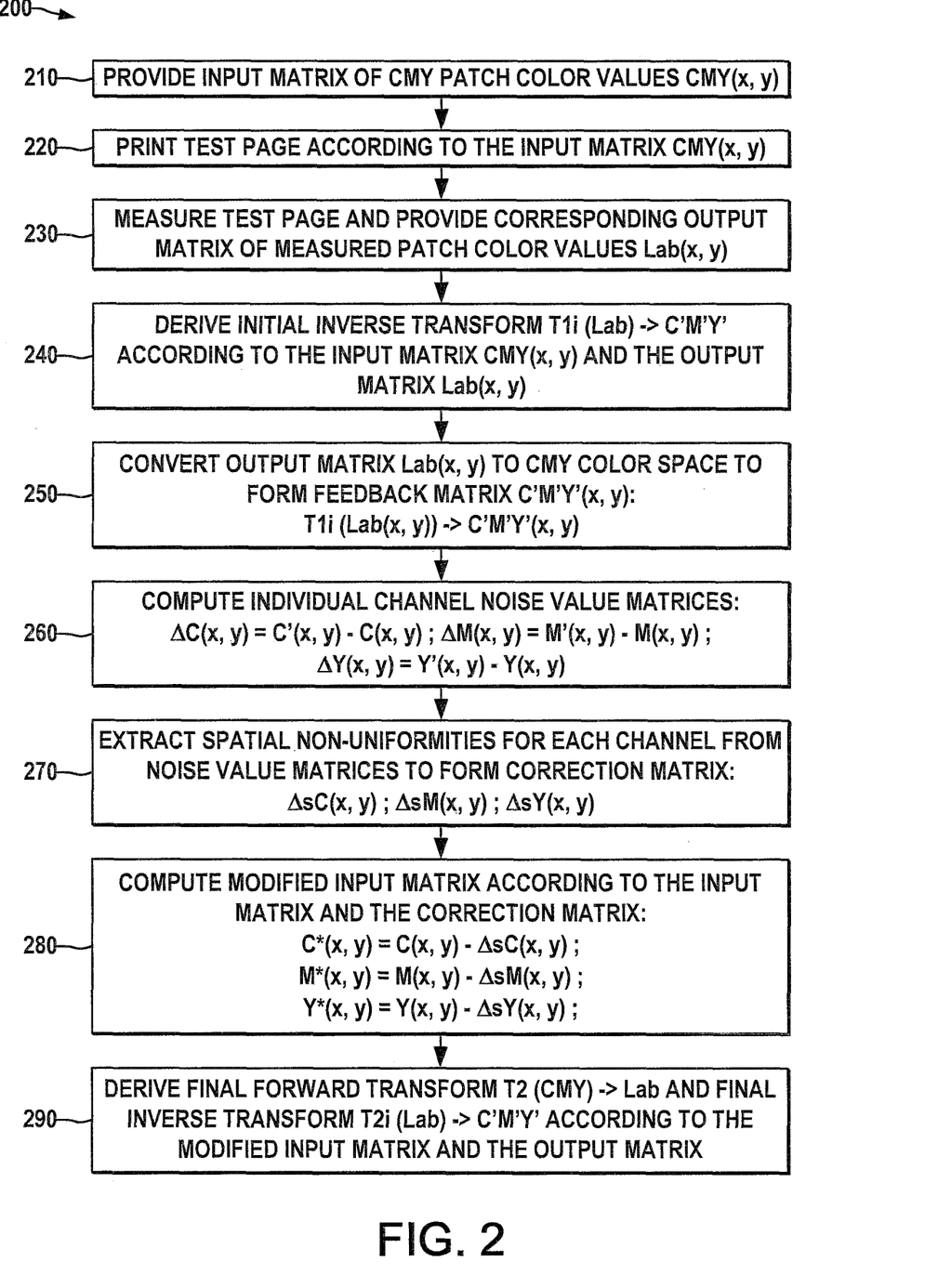
FIG. 2 is a flow diagram illustrating a detailed color printer calibration or characterization method according to the present disclosure.
Figure 3:
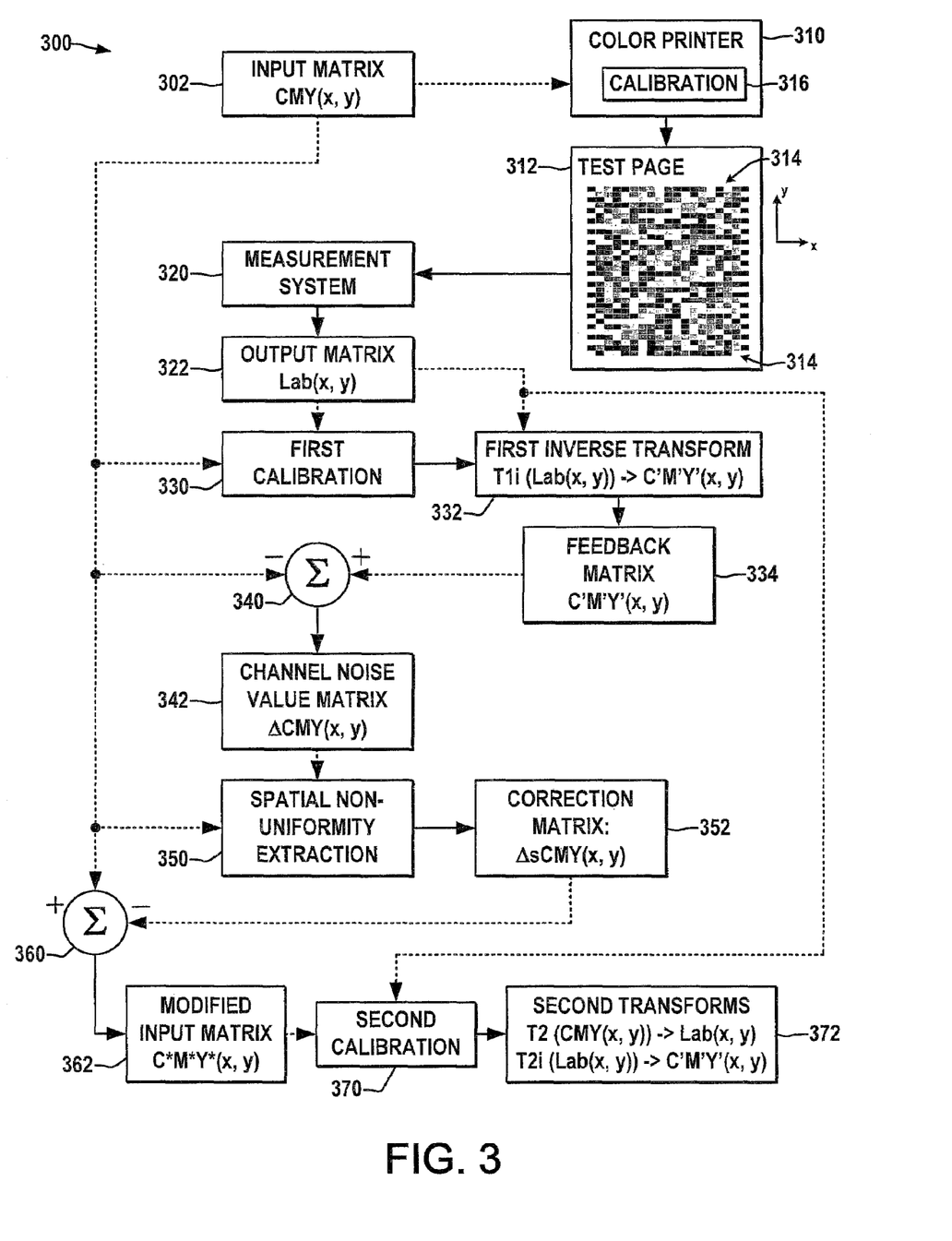
FIG. 3 is a detailed schematic diagram illustrating further details of the method of FIG. 2.
Figure 4:
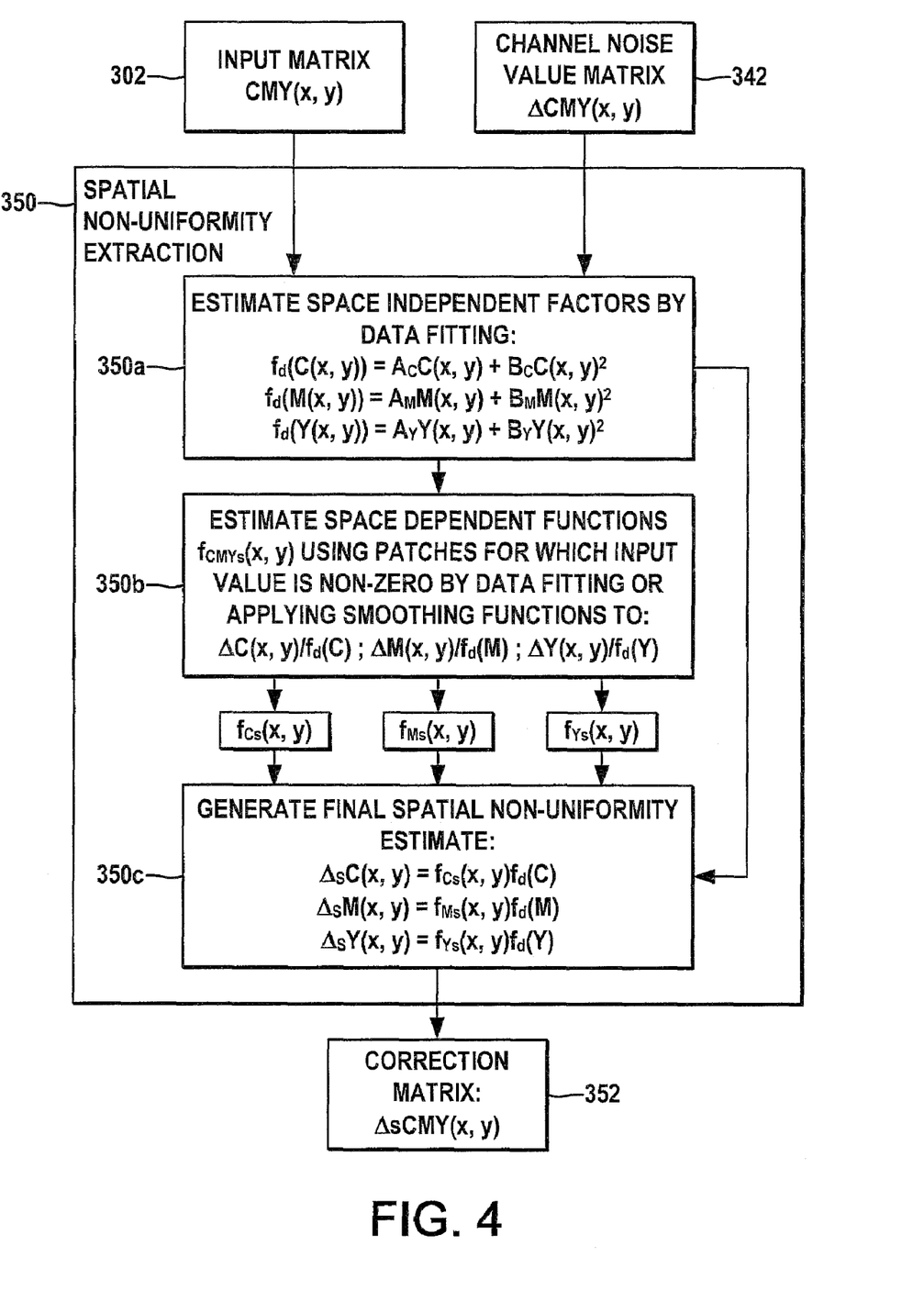
FIG. 4 is a schematic diagram illustrating exemplary spatial non-uniformity extraction operations in the method of FIGS. 2 and 3.

Referring now to FIGS. 2-4, another color printer calibration or characterization method 200 is illustrated in FIG. 2 in accordance with the present disclosure, wherein FIG. 3 provides a schematic illustration 300 of the method of FIG. 2, and FIG. 4 illustrates further details of one possible spatial non-uniformity extraction operation in the method of FIGS. 2 and 3. The example of FIG. 2 is depicted and described hereinafter in the context of an exemplary three color printer operable according to color output values in the CMY color space, wherein the measured patch values are initially characterized in the CIELab printer-independent space, although the principles and aspects of the method 200 of the present disclosure are also applicable to other printer-dependent and printer-independent-color space implementations.

A printer-dependent-color space input matrix CMY(x, y) is provided at 210 in FIG. 2, which is then used to print color patches on a test page at 220. As shown in FIG. 3, an exemplary input matrix CMY(x, y) 302 is provided to a color printer 310 being calibrated or characterized, and the printer 310 prints a test page 312 with a matrix of color patches 314 distributed in the "x" and "y" directions on the page 312. The colors of the patches 314 are then measured at 230 in FIG. 2 using a measurement system 320 (FIG. 3), such as a colorimeter, spectrophotometer, scanner, etc., and a corresponding output matrix 322 Lab(x, y) is provided. The Lab(x, y) values of this output matrix 322 are then used with the input matrix values 302 in a first calibration 330 at 240 (FIG. 2) to derive a first or initial inverse transform $T1i$(Lab)->C'M'Y' 332, and the first inverse transform 332 is employed at 250 (FIG. 2) to convert the Lab(x, y) values of the output matrix 322 to form a feedback matrix 334 including values C'M'Y'(x, y).

At 260 and 270 in FIG. 2, spatial non-uniformity of the printed test page patches is then estimated in the printer-dependent CMY color space. The inventors have appreciated that although printer non-uniformity can be quantified in terms of error vectors $\Delta E$ in a printer-independent (e.g., CIELab) color space, the effects of non-uniformities due to multiple colors are typically mixed and are thus difficult to separate using printer-independent-color space measurements. The current disclosure instead employs the printer dependent (e.g., CMY) color space to measure the spatial non-uniformity, wherein the printer error or noise is estimated by computing individual color channel noise values at 260 as the difference between the input CMY(x, y) values 302 and the feedback matrix C'M'Y'(x, y) values 334. This operation is depicted as a subtraction in FIG. 3 using a summation component 340 to yield a channel noise value matrix $\Delta$CMY (x, y) 342 according to the following set of equations (1):

$$\Delta C(x,y)=C'(x,y)-C(x,y) \quad (1)$$

$$\Delta M(x,y)=M'(x,y)-M(x,y) \text{ and}$$

$$\Delta Y(x,y)=Y'(x,y)-Y(x,y).$$

The spatial non-uniformities are then extracted (at 270 in FIG. 2) by an extraction component 350 in FIGS. 3 and 4 based on the computed noise values $\Delta$CMY(x, y) 342 to provide a correction matrix $\Delta$sCMY(x, y) 352. The inventors have appreciated that because the locations of the color patches 314 are randomly generated in constructing the input matrix CMY(x, y) 302, any spatial non-uniformity occurring in the printed test page 312 is most likely due to the printer spatial non-uniformity in the corresponding color channel, and further that such spatial non-uniformity can be estimated by spatially smoothing the noise terms ΔCMY(x, y) 342, with the resulting smoothed data being subtracted from the input matrix CMY(x, y) 302 in a second 'calibration' with which improved color accuracy can be achieved. In this respect, assuming that the noise present in one or more channels of the noise value matrix 342 ΔCMY(x, y) is not completely random as a function of its spatial distributions, the noise or color errors can be further modeled according to the following equations (2):

$$\Delta C = f_C(x, y; C) + n_C,\qquad(2)$$

$$\Delta M = f_M(x, y; M) + n_M, \text{ and}$$

$$\Delta Y = f_Y(x, y; Y) + n_Y,$$

where x, y are the spatial locations of the patches 314, $n_C$, $n_M$ and $n_Y$ are space-independent noises, and where the functions $f_C(x, y; C)$, $f_M(x, y; M)$, and $f_Y(x, y; Y)$ define the printer spatial (e.g. space dependence) non-uniformities for the C, M, and Y channels, respectively.

Referring also to FIG. 4, further details are depicted for one embodiment of an exemplary spatial non-uniformity extraction 350. In this example, the cyan non-uniformity, $f_C(x, y; C)$ is assumed to be substantially M- and Y-independent, and the same substantial independence is assumed with respect to $f_M(x, y; M)$ and $f_Y(x, y; Y)$. The individual color channel noises ΔC, ΔM, and ΔY can be modeled in this example according to the following equations (3):

$$\Delta C = f_{Cs}(x, y) f_d(C) + n_C,\qquad(3)$$

$$\Delta M = f_{Ms}(x, y) f_d(M) + n_M, \text{ and}$$

$$\Delta Y = f_{Ys}(x, y) f_d(Y) + n_Y.$$

As best shown in FIG. 4, the non-uniformity information of the modeled noise value equations (3) is extracted channel by channel in the extraction component 350. In this implementation, the space independent factors $f_d(C)$, $f_d(M)$, or $f_d(Y)$ are expected to be non-negative and will be zero when the corresponding input matrix value is zero. A quadratic function can be employed for data fitting or curve fitting the parameters A and B using linear regression with the C, M, or Y values for the variable d and the absolute values, |ΔC|, |ΔM|, or |ΔY| for the function output, $f_d(d)$ for the space independent factors $f_d(C)$, $f_d(M)$, or $f_d(Y)$ according to equation (4) below:

$$f_d(d) = A_d + B_d^2\qquad(4)$$

This curve fitting or data fitting operation is illustrated at 350a in the non-uniformity extraction example 350 in FIG. 4. At 350b in FIG. 4, the space dependence functions $f_{Cs}(x, y)$, $f_{Ms}(x, y)$, and $f_{Ys}(x, y)$ are estimated using any suitable technique, such as using a smoothing function, linear regression, neural network-based data fitting operations, etc. In the example of FIGS. 3 and 4, since low frequency variations are of particular interest, the estimation can be derived by applying a two-dimensional smoothing function to $\Delta C(x, y)/f_d(C)$, $\Delta M(x, y)/f_d(M)$, $\Delta Y(x, y)/f_d(Y)$ or using other data fitting techniques, such as linear regression for two-dimensional polynomial functions or neural-network based data fitting methods. Moreover, in this example, because some patches 314 may contain no cyan color, the estimation of $f_{Cs}(x, y)$ can exclude data from any such test page patches 314 for which the corresponding input matrix value 342 is zero, and the same criteria can be used in selecting data for the magenta and yellow colors $f_{Ms}(x, y)$ and $f_{Ys}(x, y)$. In another possible embodiment, in order to mitigate creation of artificial noise, the estimation may use only data from patches for which the input value C, M, or Y falls within a predefined range, for instance, in a middle range for the space-dependence function estimation to derive $f_{Cs}(x, y)$, $f_{Ms}(x, y)$, and $f_{Ys}(x, y)$.

At 350c in FIG. 4, the final spatial non-uniformity estimation is performed to generate the values ΔsCMY(x, y) for the correction matrix 352 according to the following equations (5):

$$\Delta sC(x, y) = f_{Cs}(x, y) f_d(C),\qquad(5)$$

$$\Delta sM(x, y) = f_{Ms}(x, y) f_d(M), \text{ and}$$

$$\Delta sY(x, y) = f_{Ys}(x, y) f_d(Y).$$

Returning to FIGS. 2 and 3, a modified input matrix 362 is then computed at 280 in FIG. 2 for use in a second "calibration". One exemplary modification of the input matrix 302 is shown in FIG. 3, wherein the values ΔsCMY(x, y) of the correction matrix 352 are subtracted from the values CMY(x, y) of the input matrix 302 at a summation component 360 to form a modified input matrix 362 of printer-dependent-color space values C*M*Y*(x, y) for use in a second "calibration" 370 to provide second or final forward and inverse transforms 372 (at 290 in the method 200 of FIG. 2) as the final output of the complete color calibration or characterization method 200.

The disclosure thus provides calibration and/or characterization techniques and techniques for determining the color response of a color printer which can be implemented in a variety of ways to combat the adverse effects of spatial non-uniformity in color printers, and can be implemented in a variety of host devices, such as in the color printer itself. For example, the color printer 310 in FIG. 3 can be provided with suitable processing and memory elements to constitute a calibration system 316, and may be programmed to implement the two-step calibration techniques described herein or portions thereof. In one embodiment, the input matrix values 302 and the first inverse transform 332 are provided as input data to the calibration system 316, and the on-board calibration components are configured to generate the feedback matrix 334, the channel noise value matrix 342 and the correction matrix 352 using any suitable spatial non-uniformity operations 350. The components of the calibration system 316 are further configured or adapted to correct the input matrix 302 according to the correction matrix 352 to generate a modified input matrix 362 with which the second calibration 370 can be performed to yield the second or final transforms 372. The disclosed techniques can also be employed to provide an indication or warning to an operator or user of the color printer 310 when the identified printer spatial non-uniformity exceeds a threshold value. Moreover, the output device calibration and characterization techniques described above may further be employed in scanner-based measurements, wherein the non-uniformity detection and correction can be generalized from patch targets to color images.

The above described examples are merely illustrative of several possible embodiments of the present disclosure, wherein equivalent alterations and/or modifications will occur to others skilled in the art upon reading and understanding this specification and the annexed drawings. The process of printing and measuring a color target and relating input to output color values could be used for applications other than calibration and characterization. One example is a diagnostics application which determines whether the color response of a device is within a given specification. A second example is a color quality analysis application wherein the color capability of the device and associated imaging system are assessed. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method of determining the color response of a color printer, the method comprising:
   printing a matrix of color patches on a test page using the color printer according to an input matrix of input colors in a printer-dependent input color space;
   measuring the printed color patches of the test page to provide a corresponding output matrix of output colors in a printer-independent-color space;
   deriving an initial inverse transform according to the input matrix and the output matrix;
   converting the output matrix of colors to input colors using the initial inverse transform to form a feedback matrix;
   computing individual color channel noise values in the input color space according to the input matrix and the feedback matrix;
   extracting spatial non-uniformity values according to the individual channel noise values to form a correction matrix in the input color space, wherein extracting spatial non-uniformities from the individual channel noise values comprises:
      estimating space independent factors for the individual color channels,
      estimating space dependent factors for the individual color channels, and
      generating final spatial non-uniformity estimate values to form the correction matrix according to the estimated space independent factors and the estimated space dependent factors; and
   computing a modified input matrix according to the input matrix and the correction matrix.

2. The method of claim 1, further comprising deriving a final inverse transform according to the modified input matrix and the output matrix.

3. The method of claim 1, wherein the printer-independent-color space is the CIELab color space.

4. The method of claim 1, wherein the printer-dependent-color space is a CMY color space.

5. The method o herein the printer-dependent-color space is a CMYK color space.

6. The method of claim 1, wherein computing the individual color channel noise values comprises subtracting individual color channel values of the input matrix from the corresponding individual color channel values of the feedback matrix.

7. The method of claim 1, wherein the space independent factors are estimated using linear regression.

8. The method of claim 1, wherein the space dependent factors are estimated using one of a smoothing function, linear regression, and neural network-based data fitting.

9. The method of claim 1, wherein computing the modified input matrix comprises subtracting the spatial non-uniformity values of the correction matrix from individual color channel values of the input matrix to form the modified input matrix.

10. A method of calibrating or characterizing a color printer, the method comprising:
    printing color patches on a test page using the color printer according to an input matrix of input color in a first space;
    measuring the printed color patches of the test page to provide a corresponding output matrix of output colors in a second space;
    converting the output matrix of colors to input colors to form a feedback matrix;
    estimating spatial non-uniformity present in the printed color patches of the test page, wherein the spatial non-uniformity is estimated in the first space;
    modifying the input matrix according to the estimated spatial non-uniformity to form a modified input matrix of input color space values; and
    generating a final inverse transform for the color printer according to the output matrix and the modified input matrix.

11. The method of claim 10, wherein the second space is the CIELab color space.

12. The method of claim 10, wherein the second space is defined by RGB signals from a scanner.

13. The method of claim 10, wherein the second space is defined by RGB signals from a digital camera.

14. The method of claim 10, wherein the first space is a CMY color space.

15. The method of claim 10, wherein the first space is a CMYK color space.

16. The method of claim 10, wherein the spatial non-uniformity is estimated according to noise values derived from the input matrix and the feedback matrix.

17. The method of claim 16, wherein estimating the spatial non-uniformity comprises subtracting individual color channel values of the input matrix from the corresponding individual color channel values of the feedback matrix.

18. The method of claim 16, wherein the spatial non-uniformity is estimated by spatially smoothing the noise values.

19. The method of claim 10, wherein modifying the input matrix comprises subtracting estimated spatial non-uniformity values from the input matrix to form the modified input matrix.

20. A system in a host device with a processor and a memory for determining the color response of a color printer according to a printed test page, comprising:
    a first component of the host device that converts an output matrix of output color in a printer-independent-color space corresponding to measurements of printed color patches of the test page into a feedback matrix;

a second component of the host device that estimates spatial non-uniformity present in the printed color patches of the test page using the feedback matrix and an input matrix of input color in a printer-dependent input color space, wherein the second component estimates the spatial non-uniformity in the first space; and a third component of the host device that modifies the input matrix according to the estimated spatial non-uniformity to form a modified input matrix of input color.

21. The system of claim 20, further comprising a fourth component of the host device that generates a final inverse transform for the color printer according to the output matrix and the modified input matrix.

22. The system of claim 20, wherein the host device is integrated into the color printer.

23. A method of calibrating or characterizing a color printer, the method comprising:

printing color patches on a test page using the color printer according to an input matrix of input color in a first space;

measuring the printed color patches of the test page to provide a corresponding output matrix of output colors in a second space;

converting the output matrix of colors to input colors to form a feedback matrix;

estimating spatial non-uniformity present in the printed color patches of the test page, wherein the spatial non-uniformity is estimated according to noise values derived from the input matrix and the feedback matrix;

modifying the input matrix according to the estimated spatial non-uniformity to form a modified input matrix of input color space values; and generating a final inverse transform for the color printer according to the output matrix and the modified input matrix.

24. The method of claim 23, wherein estimating the spatial non-uniformity comprises subtracting individual color channel values of the input matrix from the corresponding individual color channel values of the feedback matrix.

25. The method of claim 23, wherein the spatial non-uniformity is estimated by spatially smoothing the noise values.

\* \* \* \* \*